Figure 5:
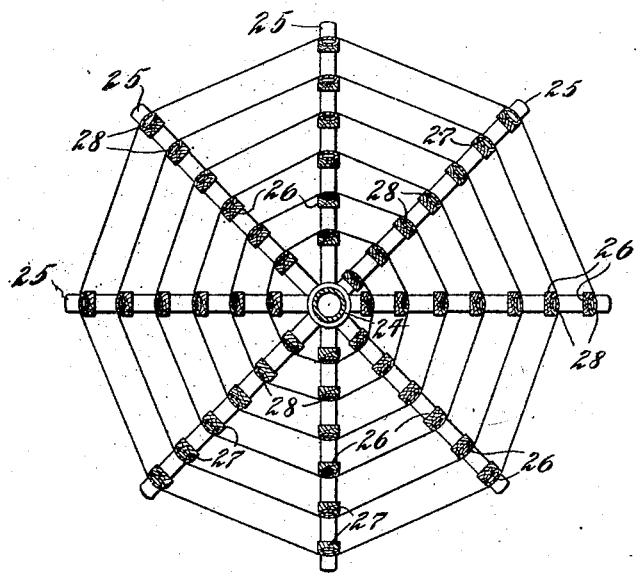

K. KIESER.
SUPPORTING FRAME OR RACK FOR FILM OR FILM LIKE MATERIAL.
APPLICATION FILED OCT. 24, 1911.
1,034,467.
Patented Aug. 6, 1912.
2 SHEETS—SHEET 1.
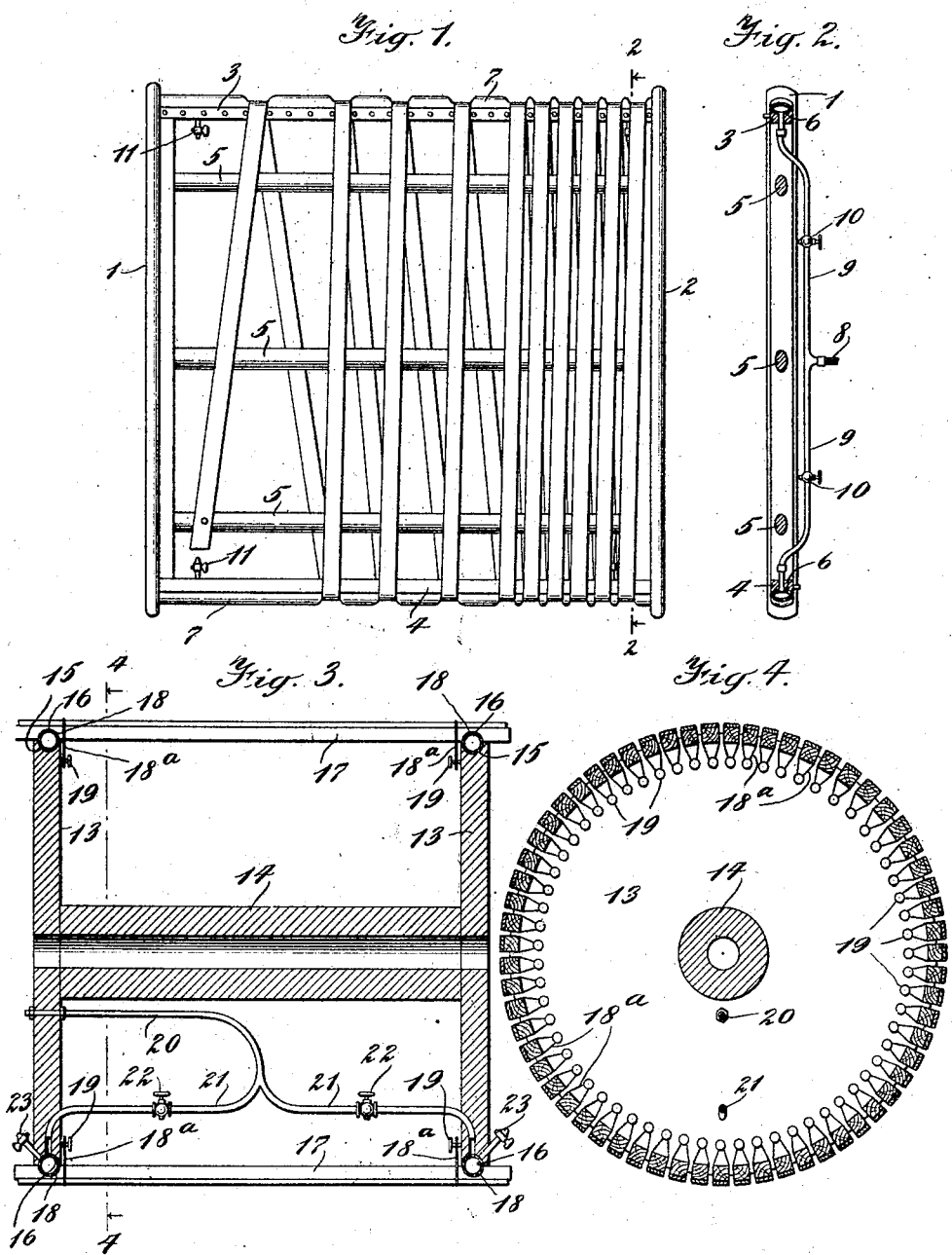

K. KIESER.
SUPPORTING FRAME OR RACK FOR FILM OR FILM LIKE MATERIAL.
APPLICATION FILED OCT. 24, 1911.

1,034,467.  Patented Aug. 6, 1912.

UNITED STATES PATENT OFFICE.

KARL KIESER, OF DUSSELDORF, GERMANY, ASSIGNOR TO FARBENFABRIKEN VORM. FRIEDR. BAYER & CO., OF ELBERFELD, GERMANY, A CORPORATION OF GERMANY.

SUPPORTING FRAME OR RACK FOR FILM OR FILM-LIKE MATERIAL.

1,034,467.     Specification of Letters Patent.     Patented Aug. 6, 1912.

Application filed October 24, 1911. Serial No. 656,495.

*To all whom it may concern:*

Be it known that I, KARL KIESER, doctor of philosophy, chemist, citizen of the German Empire, residing at Dusseldorf, Germany, have invented new and useful Improvements in Supporting Frames or Racks for Film or Film-Like Material, of which the following is a specification.

My invention relates to new and useful improvements in supporting frames or racks for film or film-like material.

It is well known that celluloid films, and to a still greater extent, non-inflammable films made from acetyl-cellulose, have the quality of expanding in contact with watery solutions, such as the sensitized emulsion, the developer, the fixing-bath, etc., and that on drying they shrink and assume their original length or may even become smaller. The expansion of celluloid films is generally not great enough to cause disturbances, yet it is advantageous to give a certain elasticity to the developing frames or developing drums, etc., so that they yield a little, when the films shrink and dry. But if the expansion exceeds about 0.2 to 0.3 per cent., difficulties arise when the films are manipulated and it is necessary to keep the film at all times under slight tension. I have found that this can be done advantageously by providing the developing or drying frames or similar appliances, upon which the film is wound, with tubes filled with fluid or gas under pressure such for example as air, so that the gradual expansion of the films in watery solutions can be adjusted by compressing air into the tubes, and when the films are drying, the shrinking is taken care of by the elasticity or compressibility of the air-tubes, or by allowing air to escape from the air-tubes in proportion to the extent of the contraction of the films.

The invention consists in the construction and combination of parts to be fully described hereinafter and the novelty of which will be particularly pointed out and distinctly claimed.

I have fully and clearly illustrated my invention in the accompanying drawings to be taken as a part of this specification and wherein—

Figure 1 is a view in elevation of one embodiment of my invention; Fig. 2 is a section on the line 2—2 of Fig. 1; Fig. 3 is a view in section of another embodiment of the same invention; Fig. 4 is a section on the line 4—4 of Fig. 3; Fig. 5 is a sectional view of a third embodiment of the invention.

Referring to the drawings by characters of reference; In the embodiment of the invention shown in Figs. 1 and 2 a frame or rack is employed which may be substantially rectangular in form and consisting of end pieces 1, 2 connected at their ends by parallel bearing members 3, 4 and intermediate bracing members 5. The members 3, 4 are preferably parallel to each other and constitute supports about which the film is wound spirally when to be treated or dried. It will be understood that the form and dimensions of the frame members and the material of which they are made may be such as is suitable to the purposes for which the invention is devised.

Each of the bearing members 3, 4 is provided on its outer face with a longitudinally extending groove 6 which receives an expansible rubber tube 7 seated therein and extending longitudinally thereof, the ends of the tube being sealed so that said tube constitutes an elastic chamber extending longitudinally of the bearing member. The rubber of which this tube is made is preferably of a high degree of elasticity so that when inflated as hereinafter described it will expand readily under the internal pressure and will yield under external pressure, the latter of course being dependent upon the degree of compression of the gas or fluid in the tube. The elastic tube 7 may be secured in place by any suitable means, such for instance as cement applied between the surface of the groove and the part of the tube seated therein.

In order to inflate the elastic chambers I provide a tube 8 which may be connected to any suitable source (not shown) of air, gas or fluid under pressure, said tube having branches 9, 9 connected to the elastic chambers, respectively, each of the said branches being provided with a suitable valve 10, by means of which the flow from the source of pressure may be controlled and permitted to enter both chambers simultaneously, or either one independently of the other as may be desired. Each elastic chamber is also provided with a valve 11 by means of which the air or gas in the chamber may be permitted to leak therefrom when desired in order to regulate the degree of compressibility of the chamber.

Each of the members 3 may be provided with a plurality of spaced pins 3ª projecting laterally therefrom and spaced apart a distance slightly greater than the width of the film strip so that when the film is wound on the form the turns of the strip may be passed between the pins to prevent the separate turns from coming in contact with each other.

While I have shown both of the bearing members 3, 4 provided with the elastic chambered bearing surfaces, I desire it understood that I may provide but one of said members with such chamber without departing from the spirit and scope of the invention.

In use the invention as above described is operated as follows: If a dry strip of film is to be subjected to a fluid, the film while wound on the frame is first wound about the frame on the bearing members in the manner shown in Fig. 1 of the drawing, and the elastic chambers being inflated so that the film will be held securely thereon with the runs out of contact with each other. When subjected to the fluid the peculiarities of the film will cause it to expand so as to more or less loosely engage the elastic chambers on the bearing members, and under this condition the chambers may be further inflated so that the film will again properly engage the same. As the film dries it may, as heretofore stated, shrink, which shrinkage will ordinarily be compensated for by the compression of the elastic chambers, but should this shrinkage cause the film to too tightly engage the bearing members the valves 11 or one of them, may be opened so as to permit the air to leak from the chamber or chambers so that the pressure against the film will be reduced to the proper degree. If the film is wet and in its expanded condition when first wrapped about the form, upon shrinking, due to the drying, the chambers will collapse or be compressed, and if necessary the air may be permitted to leak therefrom, as above described, to maintain the proper pressure of the film against the chambers.

In the form shown in Figs. 3 and 4 the invention is embodied in the form of a drum having heads 13, 13 connected by a center member 14, each head being circular in form and provided with a circumferential groove 15 in which is seated an annular tube 16 of highly elastic rubber. Against these tubes are arranged a plurality of bearing bars or members 17 formed at their ends with recesses 18 seated over the tubes, said bars being secured in position at their ends by loop members 18ª surrounding pins 19 secured to the inner faces of the heads said loops permitting inward movement of the bars but limiting outward movement. The air is supplied to these tubes in substantially the same manner as that heretofore described for the form of the invention shown in Figs. 1 and 2, that is by a tube 20 connected with a source of pressure and having branches 21, 21 connected respectively to said tubes and each provided with a controlling valve 22. Each of the tubes 16 may also be provided with an exit valve 23. In this form of the invention the operation is substantially the same as that described for the form shown in Figs. 1 and 2, the film being wound on the bearing members in spiral form and kept slightly expanded by regulating the pressure in the air tubes which regulate the pressure of the bearing members against the film.

In Fig. 5 the invention is shown as embodying a center member 24 from the opposite ends of which project radially extending arms 25, corresponding arms being connected by bearing members 26, there being a plurality of said members 26 lengthwise of each arm, and said members being arranged in spiral relation as shown. Each of the members is formed on its outer face with a groove 27, in which is seated an inflatable tube 28 extending longitudinally of each member, said tubes being provided with any arrangement for admitting air or gas thereto and regulating the compressibility or expansion of the tubes to cause them to properly engage the film. In this form of the invention the film is wound thereon in spiral form substantially as shown in Fig. 6 in a manner which is obvious. It is preferable in this form of the invention to employ air tubes of greater diameter for the outer bearing members than for those nearer the axis or center member 24.

In the form of the invention shown in Fig. 5 it will be understood that the members 26 are successively placed in the carrying frame composed of the members 25 while the film is being wound, that is the innermost members 26 are inserted in the frame and additional members 26 are inserted in the frame in spiral arrangement and succession while the film is being wound.

I desire it understood that any gas or fluid which will serve the purpose may be used for inflating the cushion members, and I do not desire to be limited in any way by the use of the word air in the specification.

I claim:—

1. A rack or reel for supporting photographic film comprising a frame having film-receiving members upon which the film may be wound, one of said members being provided with a hollow cushion of highly elastic material presenting a yielding support to the film.

2. A rack or reel for supporting photographic film comprising a frame having film-receiving members upon which the film may be wound, one of said members being provided with a cushion of inflatable elastic material presenting a yielding support to the film.

3. A rack or reel for supporting photographic film comprising a frame having film-receiving members upon which the film may be wound, one of said members being provided with a cushion of inflatable elastic material presenting a yielding support to the film, and means for regulating the degree of inflation of said cushion.

4. A rack or reel for supporting photographic film comprising a frame having film-receiving members upon which the film may be wound, said members being provided with cushions of inflatable elastic material presenting a yielding support to the film.

5. A rack or reel for supporting photographic film comprising a frame having parallel spaced film-receiving members upon which the film may be wound, said members being provided with cushions of inflatable elastic material presenting a yielding support to the film.

6. A rack or reel for supporting photographic film comprising a frame having film-receiving members upon which the film may be wound, said members being provided with cushions of inflatable elastic material extending longitudinally of said members presenting a yielding support to the film.

7. A rack or reel for supporting photographic film comprising a frame having film-receiving members upon which the film may be wound, and an inflatable tube of highly elastic material extending longitudinally of one of said members and providing a yielding support for the film.

8. A rack or reel for supporting photographic film comprising a frame having film-receiving members upon which the film may be wound, and means for providing a yielding and adjustable support for the film consisting of inflatable cushions associated with said film-bearing members.

9. A rack or reel for supporting photographic film comprising a frame having film-receiving members upon which the film may be wound, said members being provided with cushions of inflatable elastic material providing a yielding support for the film, and spacing means for spacing the runs of the film.

10. A rack or reel for supporting photographic film comprising a frame having compressible film-receiving members upon which the film may be wound, and means for simultaneously regulating the degree of compressibility of said members.

11. A rack or reel for supporting photographic film comprising a frame having compressible film-receiving members upon which the film may be wound, and means whereby the degree of compressibility of said members may be simultaneously and individually regulated.

In testimony whereof I have hereunto set my hand in the presence of two subscribing witnesses.

KARL KIESER. [L. S.]

Witnesses:
CHAS. J. WRIGHT.
L. NUFER.